Dec. 6, 1955  G. G. HUNTER  2,726,081
LOAD SUPPORTING AND VIBRATION DAMPING MOUNTING
Filed Jan. 7, 1952
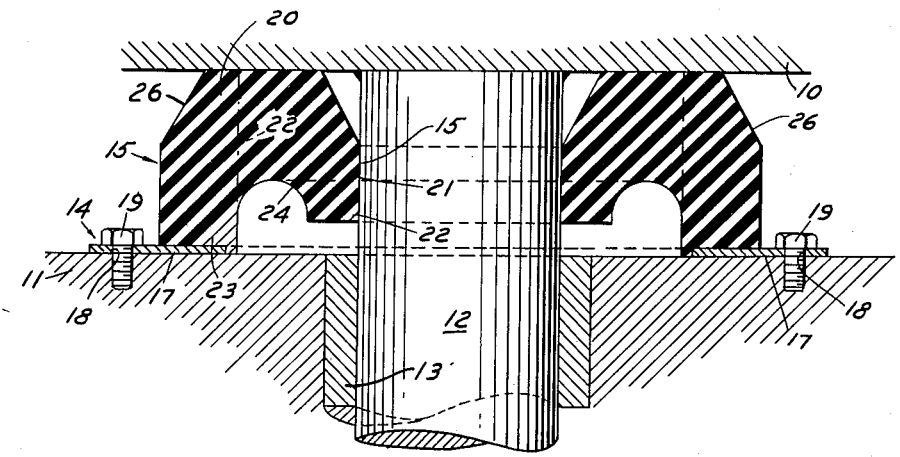
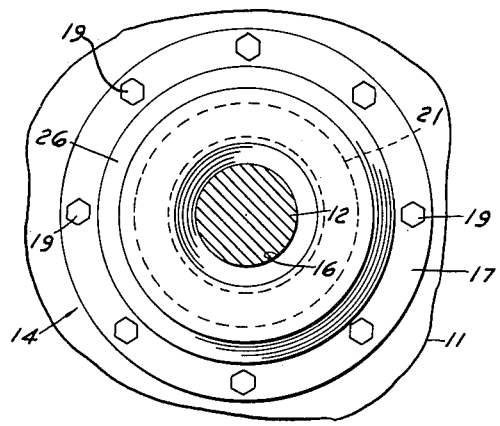
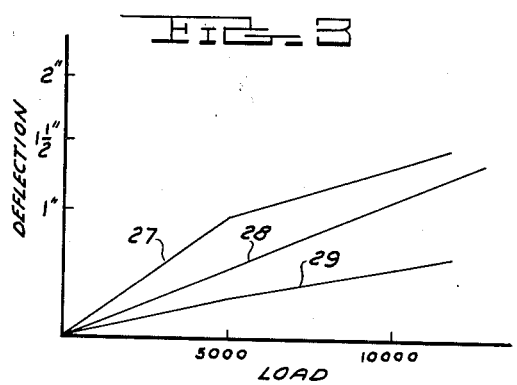
INVENTOR.
GERALD G. HUNTER
BY
ATTORNEYS

United States Patent Office 2,726,081
Patented Dec. 6, 1955

2,726,081

LOAD SUPPORTING AND VIBRATION DAMPING MOUNTING

Gerald G. Hunter, Pontiac, Mich., assignor to Baldwin Rubber Company, Pontiac, Mich., a corporation of Michigan Application January 7, 1952, Serial No. 265,349

9 Claims. (Cl. 267—63)

This invention relates to an improved load supporting and vibration damping mounting.

It is an object of this invention to provide a mounting comprising a block of resilient material constructed in a manner to provide the required rate of deflection under widely varying loads, and to also effectively absorb shocks throughout the full range of deflection.

Although the mounting forming the subject matter of this invention may be used in many cases where it is desired to resiliently support a load, nevertheless, the nature of the mounting renders its use practical in load carrying vehicles for supporting the sprung assembly from the unsprung unit. In fact exhaustive tests have shown that resilient blocks embodying the features of this invention are superior in many respects to the expensive and cumbersome semielliptical steel springs exclusively used in the past for the purpose of supporting the sprung assembly of a vehicle. As will be presently described in detail the resilient block of the mounting is constructed in a manner such that it affords proper stability during periods where no load or where a very light load is supported; and at the same time, provides a sufficiently high rate of deflection at full or approximately full loads to assure highly satisfactory riding characteristics.

The foregoing as well as other objects will be made more apparent as this description proceeds, especially when considered in connection with the accompanying drawing, wherein:

Figure 1 is a semidiagrammatic sectional view through a mounting embodying the features of this invention;

Figure 2 is a plan view of the mounting shown in Figure 1; and

Figure 3 illustrates a graph showing the deflection curve of a mounting embodying the features of this invention in relation to corresponding curves of other types of mountings.

For the purpose of illustration, the invention is defined herein as used in connection with load carrying vehicles, although it will be understood as this description proceeds that the mouting may be used in practically all cases where it is desired to resiliently support a load.

With the above in view reference is made more in detail to Figure 1 of the drawing, wherein it will be noted that the numeral 10 indicates a member which may be considered a part of the sprung assembly of a vehicle, and the numeral 11 designates a member which may be considered a part of the unsprung unit of a vehicle. The member 10 is positioned above the member 11, and a guide pin 12 is secured in any suitable manner to the member 10. The guide pin extends downwardly from the member 10 through the member 11, and is slidably supported on the member 11 by a bushing 13. The construction is such as to permit relative movement of the members toward and away from each other, but at the same time, hold the members against relative shifting movement in directions perpendicular to the pin axis.

The members 10 and 11 are supported in vertical spaced relationship by a mounting 14 comprising a block 15 of resilient material, such for example as rubber, or synthetic rubber. It is preferred to use a rubber or rubber-like material having an exceptionally high hysteresis characteristic, and highly satisfactory results have been obtained by using "Buna" synthetic rubber or a combination of crude rubber and "Buna," or a butyl composition.

Regardless of the specific composition of the resilient block 15, the latter is preferably in the form of a ring interposed between the members 10 and 11, and having a central opening 16 therethrough of a diameter such as to freely receive the guide pin 12. If desired a metal clamping ring 17 may be vulcanized or otherwise secured to the bottom face of the block 15. The diameter of the metal ring 17 exceeds the outside diameter of the block 15, and suitable openings 18 are provided in the peripheral portion of the ring 17 to receive fastener elements 19, which serve to secure the block to the unsprung unit or member 11.

For the purpose of this description, the block 15, although of one piece construction, may be considered as comprising two parts 20 and 21. The broken line 22' in Figure 1 of the drawing may be considered the dividing line between the outer part 20 and the inner part 21. Referring again to Figure 1 of the drawing, it will be noted that the top surface of the outer part 20 has a bearing engagement with the member 10, and the bottom surface of the part 20 has a bearing engagement with the member 11. On the other hand the inner part 21 has a top surface which forms a continuation of the top surface of the part 20 and engages the member 10. However the bottom portion of the inner part 21 surrounding the guide pin 12 terminates short of, or in other words, is spaced from the member 11. This bottom portion of the part 21 is indicated by the numeral 22, and the resilient material between the portion 22 and the corresponding portion 23 of the part 20 is relieved by forming an annular recess 24 in the bottom of the block 15.

When little or no pay load is supported on the member 10, the mounting 14 assumes the position thereof shown in Figure 1 of the drawing, where the outer part 20 of the mounting serves to support the load of the member 10. In this position of the mounting, a high rate of deflection is provided, and satisfactory riding qualities are obtained. When the load on the mounting 14 is substantially increased, the rubber block 15 is deflected by the load sufficiently to engage the annular portion 22 of the block with the member 11. Engagement of the portion 22 with the member 11 places the part 21 under compression between the members, and the resistance afforded by the mounting to continued deflection by the load is increased. However, due to the annular recess 24, portions of the resilient block act in shear as well as compression, so that the mounting not only effectively supports the load, but in addition, serves to absorb shocks. Hence satisfactory riding qualities are obtained under full load conditions as well as under light or no load conditions. In the event it is desired to increase the deflection characteristic of the resilient block 15, the opposite sides of the block adjacent the top of the latter are tapered to converge toward one another in the manner indicated by the numeral 26. This has the effect of reducing the bearing area at the top of the block, and hence the rate of deflection of the block is increased for a given load.

In Figure 3 of the drawings, I have illustrated three deflection curves indicated by the numerals 27, 28 and 29. The curve 27 illustrates the deflection characteristics for a resilient mounting constructed in accordance with this invention, and the curve 28 designates the deflection characteristics of a semielliptical steel spring. The curve 29 on the other hand designates the deflection characteristics of a solid rubber biscuit or block of the same size as the resilient mounting having the deflection curve 27. By comparing the above curves, it will be noted that the mounting embodying the features of the present invention has a very superior deflection characteristic through a wide range of loads than either the steel spring or the solid rubber mounting.

What I claim as my invention is:

1. In combination with spaced members relatively movable in directions toward and away from each other and a guide extending between the members to resist lateral shifting movement of the members, a load supporting and vibration damping mounting comprising an integral ring of resilient material positioned between said members and sleeved over said guide, said ring having a first annular portion having its opposite end faces respectively engaging said members, said end faces being aligned in the direction of relative movement of said members to place said first annular portion under compression upon relative movement of said members toward each other, said ring having a second annular portion radially inwardly of said first portion and having its opposite end faces aligned in the direction of relative movement of said members for engagement with said respective members, the end faces of said second annular portion being more closely spaced than said end faces of said first annular portion and being responsive to a predetermined increase in load to engage said members and place said second annular portion under compression between said members, thereby providing increased resistance to continued relative movement of the members toward each other.

2. Structure as defined in claim 1, in which the end faces of said annular portions at one end of said ring are coplanar for simultaneous engagement with the adjacent member, and in which the end face of said second annular portion at the other end of said ring is spaced from the adjacent end face of the first annular portion in a direction toward the said one end of said ring.

3. Structure as defined in claim 2, in which said ring has an annular recess in one of its ends separating the adjacent end faces of said annular portions.

4. Structure as defined in claim 1, in which the end faces of said annular portions at one end of said ring are coplanar for simultaneous engagement with the adjacent member, and in which the end face of said second annular portion at the other end of said ring is spaced from the adjacent end face of the first annular portion in a direction toward the said one end of said ring, and in which said ring has an annular recess at the said other end thereof positioned to separate the adjacent end faces of said annular portions.

5. In combination with spaced members relatively movable in directions toward and away from each other and a guide extending between the members to resist lateral shifting movement of the members, a load supporting and vibration damping mounting comprising an integral ring of resilient material positioned between said members and sleeved over said guide, said ring having a first annular portion having its opposite end faces respectively engaging said members, said end faces being aligned in the direction of relative movement of said members to place said first annular portion under compression upon relative movement of said members toward each other, said ring having a second annular portion radially inwardly of said first portion and having its opposite end faces engageable with said respective members, the end faces of said second annular portion being more closely spaced than said end faces of said first annular portion and being responsive to a predetermined increase in load to engage said members and provide increased resistance to continued relative movement of the members toward each other.

6. In combination with spaced members relatively movable in directions toward and away from each other and a guide extending between the members to resist lateral shifting movement of the members, a load supporting and vibration damping mounting comprising an integral ring of resilient material positioned between said members and sleeved over said guide, said ring having a first annular portion having its opposite end faces respectively engaging said members, said end faces being aligned in the direction of relative movement of said members to place said first annular portion under compression upon relative movement of said members toward each other, said ring having a second annular portion radially inwardly of said first portion and having its opposite end faces engageable with said respective members, the inner annular surface of said second annular portion slidably receiving said guide, the end faces of said second annular portion being more closely spaced than the end faces of said first annular portion and being responsive to a predetermined increase in load to engage said members and provide increased resistance to continued relative movement of the members toward each other.

7. In combination with spaced members relatively movable in directions toward and away from each other and a guide extending between the members to resist lateral shifting movement of the members, a load supporting and vibration damping mounting comprising an integral ring of resilient material positioned between said members and sleeved over said guide, said ring having a first annular portion having its opposite end faces respectively engaging said members, said end faces being aligned in the direction of relative movement of said members to place said first annular portion under compression upon relative movement of said members toward each other, said ring having a second annular portion radially inwardly of said first portion and having its opposite end faces engageable with said respective members, the inner annular surface of said second annular portion slidably receiving said guide, the end face of said second annular portion at one end of said ring being coplanar with the adjacent end face of the first annular portion and likewise engaging the adjacent member, the end face of said second annular portion at the other end of said ring being spaced from the adjacent end face of the first annular portion in a direction toward the said one end of said ring, the end face of said second annular portion at the other end of said ring being engageable with the adjacent member in response to a predetermined increase in load to enable said second annular portion to provide increased resistance to continued movement of the members toward each other.

8. Structure as defined in claim 7 in which said ring has an annular recess in one of its ends separating the adjacent end faces of said annular portions.

9. Structure as defined in claim 7 in which said ring has an annular recess in the said other end thereof positioned to separate the adjacent end faces of said annular portions.

UNITED STATES PATENTS

References Cited in the file of this patent

| 2,037,032 | Lord | Apr. 14, 1936 |
| 2,147,660 | Loewus | Feb. 21, 1939 |
| 2,196,428 | Saurer | Apr. 9, 1940 |
| 2,245,295 | Reynold | June 10, 1941 |
| 2,538,955 | Efromson et al. | Jan. 23, 1951 |

FOREIGN PATENTS

| 10,615 | Great Britain | of 1889 |
| 23,589 | Great Britain | 1913 |
| 586,608 | Great Britain | Mar. 25, 1947 |